(12) United States Patent
Lee

(10) Patent No.: US 11,287,683 B2
(45) Date of Patent: Mar. 29, 2022

(54) DISPLAY PANEL AND DISPLAY APPARATUS HAVING THE SAME

(71) Applicant: SAMSUNG ELECTRONICS CO., LTD., Suwon-si (KR)

(72) Inventor: Kye Hoon Lee, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 519 days.

(21) Appl. No.: 16/326,613

(22) PCT Filed: Jun. 28, 2017

(86) PCT No.: PCT/KR2017/006809
§ 371 (c)(1),
(2) Date: Feb. 19, 2019

(87) PCT Pub. No.: WO2018/034423
PCT Pub. Date: Feb. 22, 2018

(65) Prior Publication Data
US 2021/0302781 A1   Sep. 30, 2021

(30) Foreign Application Priority Data
Aug. 17, 2016   (KR) .................. 10-2016-0104257

(51) Int. Cl.
*G02F 1/1335* (2006.01)
*G02F 1/017* (2006.01)
(Continued)

(52) U.S. Cl.
CPC .... *G02F 1/133514* (2013.01); *G02F 1/01791* (2021.01); *G02F 1/1337* (2013.01); *G02F 1/13439* (2013.01); *G02F 1/133531* (2021.01)

(58) Field of Classification Search
None
See application file for complete search history.

(56) References Cited

U.S. PATENT DOCUMENTS

2008/0084517 A1   4/2008   Itou et al.
2008/0252824 A1*  10/2008  Kadowaki ......... G02F 1/133528
                                                          349/96
(Continued)

FOREIGN PATENT DOCUMENTS

KR   10-2010-0037283 A   4/2010
KR   10-2016-0089700 A   7/2016
KR   10-1794653 B1      11/2017

OTHER PUBLICATIONS

International Searching Report dated Oct. 25, 2017 by the International Searching Authority in counterpart International Patent Application No. PCT/KR2017/006809.
(Continued)

*Primary Examiner* — James A Dudek
(74) *Attorney, Agent, or Firm* — Sughrue Mion, PLLC

(57) ABSTRACT

Disclosed herein is a display panel capable of avoiding a wire grid polarizer (WGP) process requiring a high temperature process and preventing deformation of a film polarizer by replacing a WGP with a film polarizer and by separately filming a transparent electrode and an alignment layer, a display apparatus having the display panel and a method of manufacturing the display panel. The display panel comprises a quantum dot color filter layer configured to convert a color of light emitted from a light source, a common electrode spaced apart from the quantum dot color filter layer, and a film polarizer arranged between the quantum dot color filter layer and the common electrode, and configured to be laminated with the quantum dot color filter layer after being laminated with the common electrode.

14 Claims, 19 Drawing Sheets

(51) Int. Cl.
*G02F 1/1337* (2006.01)
*G02F 1/1343* (2006.01)

(56) References Cited

U.S. PATENT DOCUMENTS

2010/0201909 A1  8/2010  Jung et al.
2012/0293748 A1  11/2012  Jung et al.

OTHER PUBLICATIONS

Written Opinion dated Oct. 25, 2017 by the International Searching Authority in counterpart International Patent Application No. PCT/KR2017/006809.

* cited by examiner

DISPLAY PANEL AND DISPLAY APPARATUS HAVING THE SAME

TECHNICAL FIELD

The present disclosure relates to a display panel using a quantum dot as a color filter, and a display apparatus having the same.

BACKGROUND ART

A display apparatus is an apparatus provided with a display panel for displaying an image so as to display image data in various formats such as a broadcast signal.

The display panel is classified into an emissive display panel that emits light by itself and a non-emissive display panel that requires a separate light source. The emissive display panel may include a cathode ray tube (CRT) panel, an electro luminescence (EL) panel, an organic Light emitting diode (OLED) panel, a vacuum fluorescence display (VFD) panel, a field emission display (FED) panel, and a plasma display panel (PDP) panel. The non-emissive display panel may include a liquid crystal display (LCD) panel.

The display apparatus having a LCD panel further includes a backlight unit that emits light to the rear of the LCD panel. The emitted light passes through a color filter provided in the LCD panel, and displays colors. In a conventional manner, a filtering has been performed using dyes or pigments that selectively transmit or block a particular range of wavelengths. In recent, research and development on a filtering method by converting a color using quantum dots have been carried out.

DISCLOSURE

Technical Problem

The present disclosure is directed to providing a display panel capable of avoiding a wire grid polarizer (WGP) process requiring a high temperature process and preventing deformation of a film polarizer by replacing a WGP with a film polarizer and by separately filming a transparent electrode and an alignment layer, a display apparatus having the display panel and a method of manufacturing the display panel.

Technical Solution

One aspect of the present disclosure provides a display panel including a quantum dot color filter layer configured to convert a color of light emitted from a light source, a common electrode spaced apart from the quantum dot color filter layer, and a film polarizer arranged between the quantum dot color filter layer and the common electrode, and configured to be laminated with the quantum dot color filter after being laminated with the common electrode.

The common electrode may be coated with at least one of sliver nanowires and graphene.

The common electrode may be formed of a transparent electrode material, selected from at least one of Indium Tin Oxide (ITO) and Indium Zinc Oxide (IZO).

The display panel may further include an alignment layer coated on the common electrode.

The display panel may further include a transparent front substrate laminated with the quantum dot color filter layer, and a low refractive layer arranged between the quantum dot color filter layer and the front substrate and having a refractive index that is lower than a refractive index of the quantum dot color filter layer.

The refractive index of the low refractive layer may be within a range of about 1.2 to about 1.4.

The low refractive layer may include a resin, and nano-particles distributed in the resin, and the nano-particles may be selected from at least one of titanium dioxide ($TiO_2$) and zinc oxide (ZnO).

Another aspect of the present disclosure provides a method of manufacturing a display panel including manufacturing a common electrode by coating the common electrode with a transparent electrode film, coating an upper surface of the common electrode with an alignment layer, laminating a film polarizer to a lower surface of the common electrode, and laminating a quantum dot color filter layer converting a color of light emitted from a light source, to a lower surface of the film polarizer.

The manufacturing of the common electrode may include manufacturing a common electrode by coating the common electrode with at least one of sliver nanowires and graphene.

The transparent electrode film is formed of transparent electrode material selected from at least one of Indium Tin Oxide (ITO) and Indium Zinc Oxide (IZO).

The lamination of the quantum dot color filter layer may include laminating the quantum dot color filter layer to the lower surface of the film polarizer after laminating a transparent front substrate to a lower surface of the quantum dot color filter layer.

The method may further include manufacturing a lower substrate on which a rear alignment layer, a rear electrode and a rear substrate are sequentially arranged.

The method may further include injecting a liquid crystal between the alignment layer and the rear alignment layer.

The method may further include laminating a polarizing film layer to a lower surface of the rear substrate.

Another aspect of the present disclosure provides a display apparatus including a back light unit having a light source, a quantum dot color filter layer arranged in front of the back light unit to convert a color of light emitted from the light source, a common electrode spaced apart from the quantum dot color filter layer, and a film polarizer arranged between the quantum dot color filter layer and the common electrode, and configured to be laminated with the quantum dot color filter layer after being laminated with the common electrode.

The common electrode may be coated with at least one of sliver nanowires and graphene.

The common electrode may be formed of a transparent electrode material and the transparent electrode material may be selected from at least one of Indium Tin Oxide (ITO) and Iridium Zinc Oxide (IZO).

The display apparatus may further include an alignment layer coated on the common electrode.

The display apparatus may further include a transparent front substrate laminated with the quantum dot color filter layer, and a low refractive layer arranged between the quantum dot color filter layer and the front substrate and having a refractive index that is lower than a refractive index of the quantum dot color filter layer.

The refractive index of the low refractive layer may be within a range of about 1.2 to about 1.4.

The low refractive layer may include a resin, and nano-particles distributed in the resin, and the nano-particles may be selected from at least one of titanium dioxide ($TiO_2$) and zinc oxide (ZnO).

Advantageous Effects

According to a display apparatus and a method of manufacturing a display panel, it may be possible to avoid a wire grid polarizer (WGP) process requiring a high temperature process and prevent deformation of a film polarizer by replacing a WGP with a film polarizer and by separately filming a transparent electrode and an alignment layer.

[Modes for the Invention]

Hereinafter various embodiments of the present disclosure will be described in detail with reference to the accompanying drawings.

A display panel according to one embodiment may be a liquid crystal display (LCD) panel provided with a color filter to display desired colors.

A typical LCD panel uses a color filter configured with dyes or pigments that selectively transmit or block a particular range of wavelengths. For example, a color filter may include a blue filter transmitting a blue color and absorbing other colors other than blue color, a green filter transmitting a green color and absorbing other colors other than the green color, and a red filter transmitting a red color and absorbing other colors other than red color. In this case, since the color filter absorbs some of incident rays, a loss is generated in the brightness and a color reproduction area narrows down. Therefore, according to one embodiment, the display panel employs a light conversion type color filter instead of a light absorption type color filter.

Figure 1:
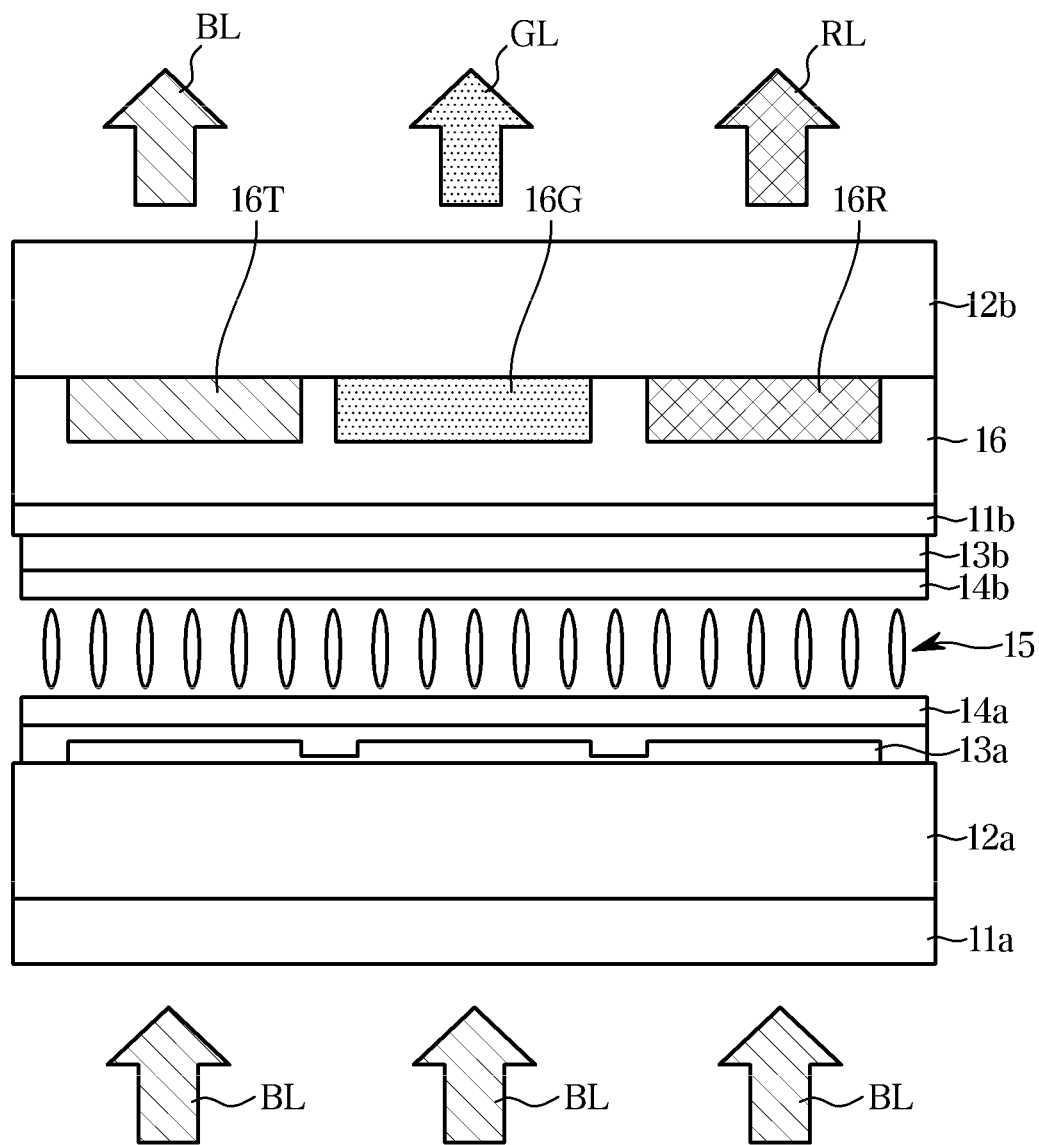
FIG. 1 is a cross-sectional view of a display panel including a light conversion type color filter.

FIG. 1 is a cross-sectional view of a display panel including a light conversion type color filter. In an example of FIG. 1, a direction in which light is emitted to the outside corresponds to a direction in which an image is provided to a viewer looking at a display panel 10. This is referred to as a forward direction of the display panel 10.

Referring to FIG. 1, light irradiated from a backlight unit is incident to the display panel 10. For example, the backlight unit may irradiate blue light BL.

The blue light BL is incident to a rear polarizer 11a of the display panel 10, and the rear polarizer 11a may polarize the blue light BL and then transmit only the light that vibrates in the same direction as a polarization axis to a rear substrate 12a.

The rear substrate 12a may be a glass substrate, and may include a Thin Film Transistor (TFT) array. The TFT array represents a substrate having a function of an electric circuit driving a liquid crystal, and the TFT array serves as a switching element transmitting a signal to the liquid crystal or blocking the signal.

That is, the rear substrate 12a may be provided such that a TFT and a display pixel electrode are arranged on a glass substrate, and a gate wire for driving each TFT and a signal wire for sending a write voltage signal to a pixel may be provided on the glass substrate.

A rear electrode 13a may be provided on a front surface of the rear substrate 12a, and the rear electrode 13a may be a pixel electrode. The rear substrate 12a may be formed of a transparent material such as polymethyl methacrylate (PMMA) or glass.

A rear alignment layer 14a may be formed on a front surface of the rear electrode 13a, and a liquid crystal may be injected between the rear alignment layer 14a and a front alignment layer 14b.

The front alignment layer 14b and a front polarizer 11b may be disposed in front of the rear substrate 12a, and a front electrode 13b may be provided on the rear surface of the front polarizer 11b. The front electrode 13b may be a common electrode, and may be formed of a transparent electrode material such as indium tin oxide (ITO) or indium zinc oxide (IZO).

Current flows to a liquid crystal layer 15 according to the voltage applied to the rear electrode 13a and the front electrode 13b. When the current flows to the liquid crystal layer 15, an arrangement of liquid crystal molecules forming the liquid crystal layer 15 is adjusted.

Light passing through the liquid crystal layer 15 is incident to the front polarizer 11b, and light passing through the film polarizer 11b is incident to a quantum dot color filter layer 16 disposed on the front surface of the front polarizer 11b.

The film polarizer 11b may employ a wire grid polarizer (hereinafter refer to as "WGP") that is a reflective type polarizer that prevents loss of light. However, when the WGP is used as the front polarizer 11b, a high temperature process (e.g., 230 degree) is required, and there is a risk of deformation of the quantum dot color filter layer 16, which is described later, during the high temperature process.

The quantum dot color filter layer 16 may include a red light converter 16R configured to convert incident light into red light by using quantum dots, and a green light converter 16G configured to convert incident light into green light by using quantum dots, and a light transmitter 16T configured to transmit the incident light.

The blue light BL incident to the quantum dot color filter layer 16 is converted to red light RL and green light BL in the red light converter 15R and green light converter 15G, respectively. The blue light BL incident to the light transmitter 15T is not color-converted, but transmitted.

The light passing through the quantum dot color filter layer 16 or being color-converted in the quantum dot color filter layer 16 is incident to the front substrate 12b, which is arranged on the front surface of the quantum dot color filter layer 16. The light that passes through the front substrate 12b and then emitted to the outside is observable by a viewer as an image.

Figure 2:
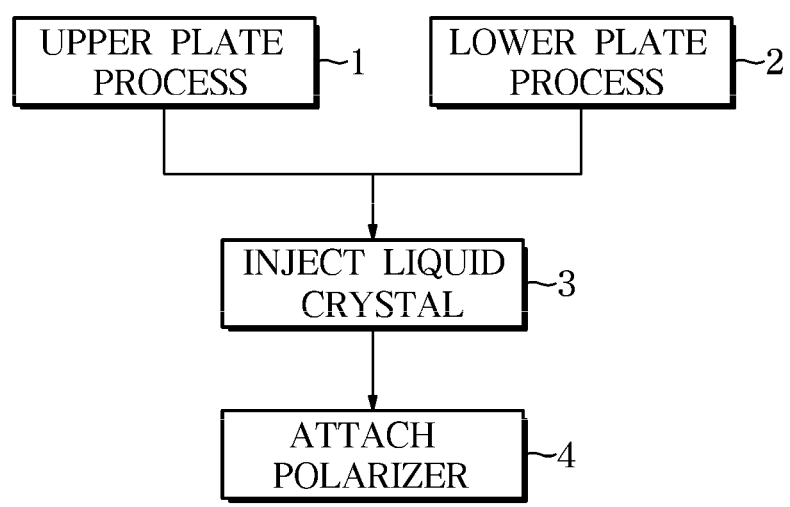
FIGS. 2 and 3 are views showing a display panel using Wire Grid Polarizer (WGP) as a polarizer and a manufacturing process of the display panel.
Figure 3:
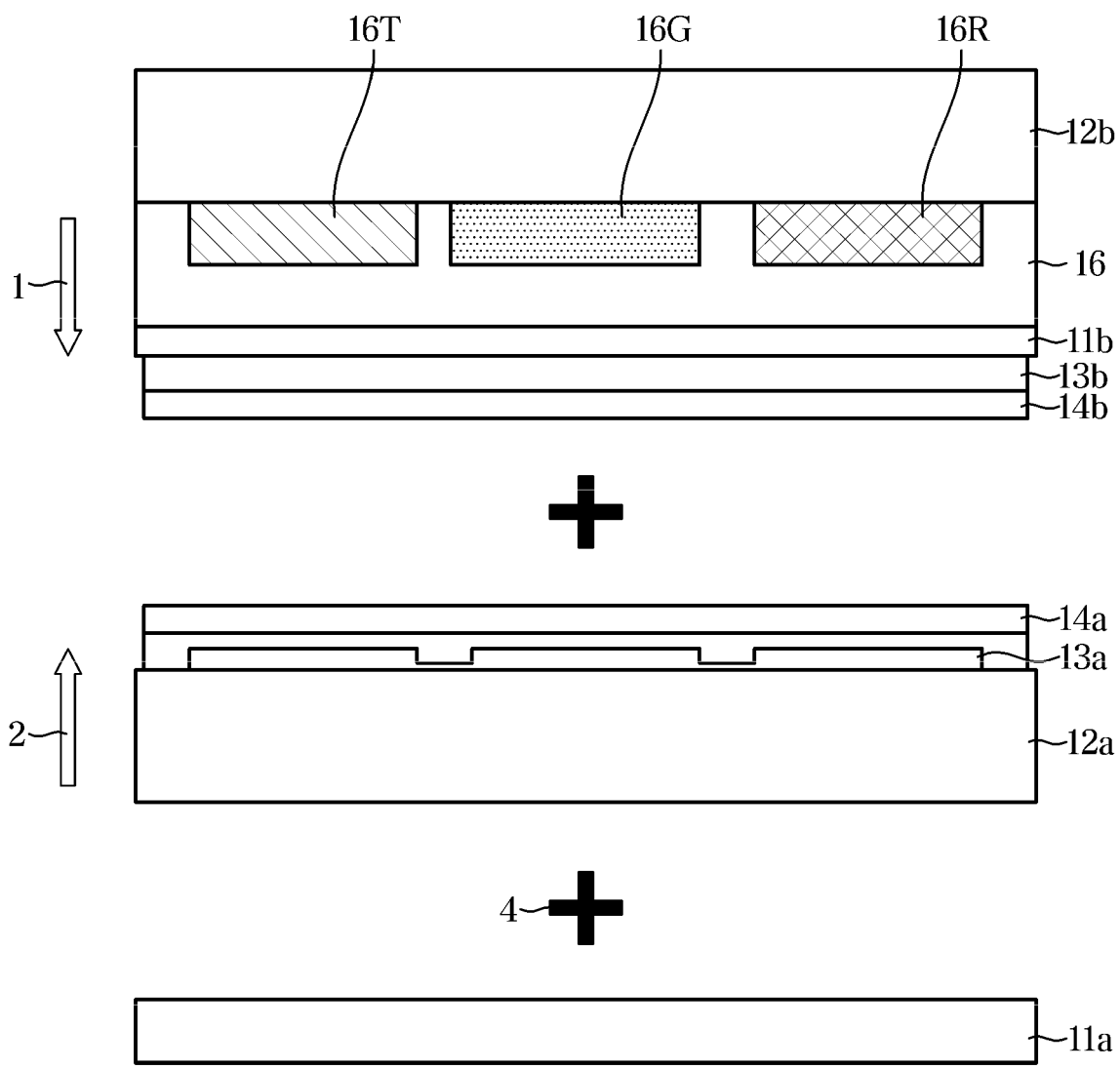

FIGS. 2 and 3 are views showing a display panel using Wire Grid Polarizer (WGP) as a polarizer and a manufacturing process of the display panel.

Particularly, FIG. 2 is a flowchart showing a process of manufacturing the display panel 10. FIG. 3 is a view showing the display panel 10 of FIG. 1 that is separated according to a manufacturing process of FIG. 2. To avoid redundant descriptions, the following will be described together.

Referring to FIG. 2, the display panel 10 using a Wire Grid Polarizer (WGP) as the polarizer 11b is manufactured through an upper plate process (1) and a lower plate process (2) and then an injection of liquid crystal between the upper plate and the lower plate (3).

After the liquid crystal layer 15 is formed, a rear polarizer (i.e., film polarizer) 11a is attached to the lower plate (4).

The upper plate process (1) of FIG. 2 is a process for manufacturing the front substrate 12b, the quantum dot color filter layer 16, the front polarizer 11b, the front electrode 13b and the front alignment layer 14b of FIG. 3, in order.

That is, in the upper plate process (1), the color filter layer 16 is laminated to the front substrate 12b that is previously manufactured, and the front polarizer 11b and the front electrode 13b are laminated thereunder. The front alignment layer 14b is coated thereon.

In the lower plate process (2) of FIG. 2, the rear electrode 13a is laminated on the rear substrate 12a of FIG. 3 and the rear alignment layer 14b is coated thereon.

After the upper plate process (1) and the lower plate process (2) are completed, a liquid crystal is injected between the front alignment layer 14b and the rear alignment layer 14a and thus the liquid crystal layer 15 is formed.

Thereafter, the rear polarizer 11a is attached, and the process of the display panel 10 of FIG. 1 is completed.

Meanwhile, the aforementioned WGP is used as the front polarizer 11b, which is laminated under the quantum dot color filter layer 16 during the upper plate process (1). The WGP will be formed to have a thin thickness and has the advantage that the color mixing does not occur between pixels. However, the WGP process requires very high precision, and has a difficulty in the implementation, particularly it is difficult to make a large area.

Therefore, according to one embodiment, a polarizer film is used instead of WGP in the front polarizer 11b, and it is possible to provide a process that avoids the high-temperature process by changing the conventional manufacturing process of the display panel.

Figure 4:
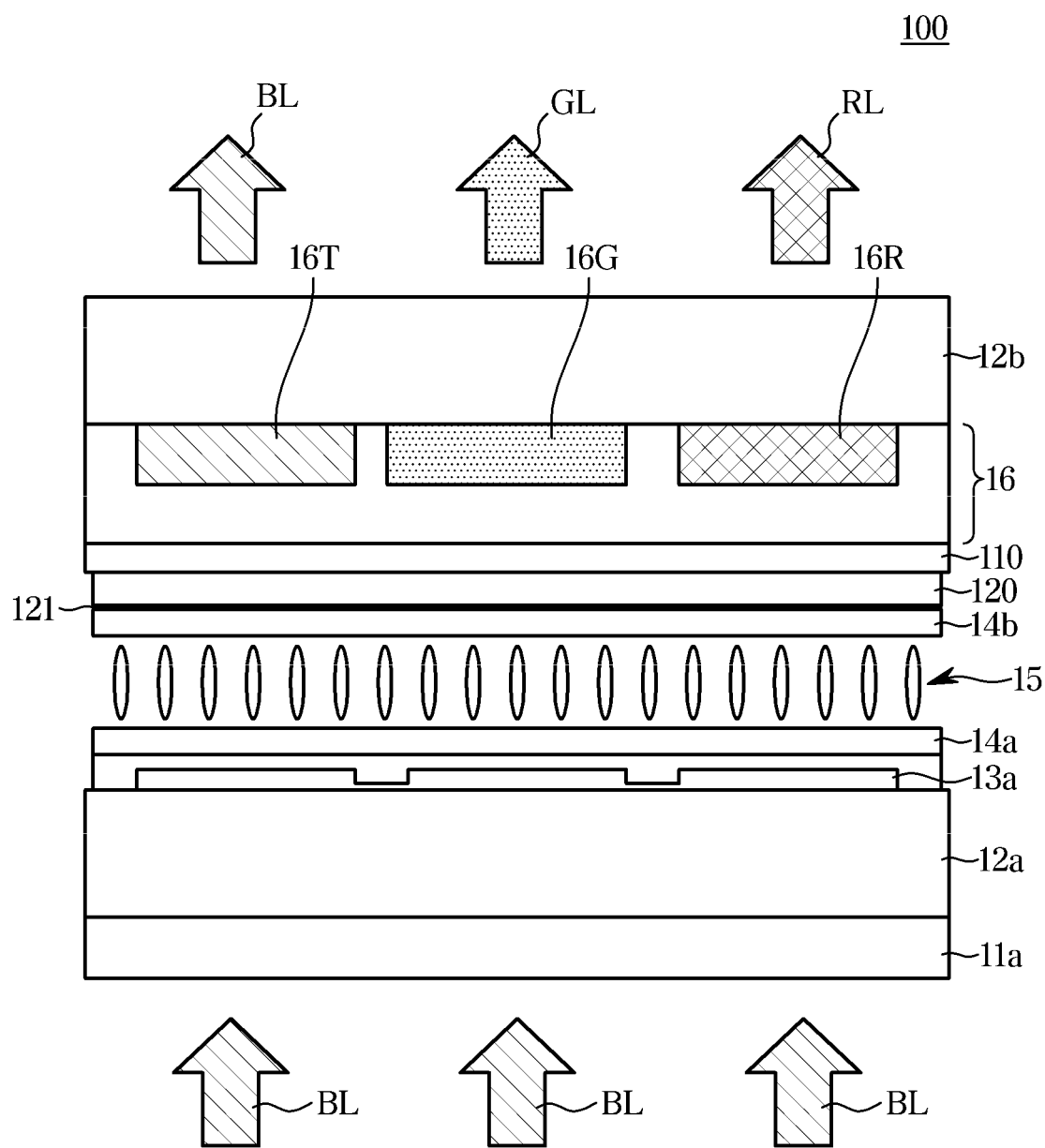
FIG. 4 is a cross-sectional view of a display panel according to one embodiment of the present disclosure.

FIG. 4 is a cross-sectional view of a display panel according to one embodiment of the present disclosure.

In the same as FIG. 1, in an example of FIG. 4, a direction in which light is emitted to the outside corresponds to a direction in which an image is provided to a viewer looking at a display panel 100. This is referred to as a forward direction of the display panel 100.

Referring to FIG. 4, light irradiated from a backlight unit is incident to the display panel 100. According to one embodiment, the backlight unit may irradiate blue light BL.

The blue light BL may be incident to a rear polarizer 11a of the display panel 100, and the rear polarizer 11a may be configured to polarize the blue light BL and then only transmit rays that vibrate in the same direction as the polarization axis to a rear substrate 12a. According to one embodiment, with respect to a liquid crystal layer 15, the front surface refers to a direction in which the light propagates and the rear surface refers to a direction from which a light source is located, that is from which the light is incident.

The rear polarizer 11a may be implemented in the form of a film, and may be implemented as a vertical polarizer that vertically polarizes the incident light or as a horizontal polarizer that horizontally polarizes the incident light.

A rear substrate 12a may be located on the front surface of the rear polarizer 11a. The rear substrate 12a may be formed of a transparent material in order to allow the light incident from the rear direction to be transmitted. For example, the rear substrate 12a may be formed of a synthetic resin such as acryl, or glass.

The rear substrate 12a may be a glass substrate, and the rear substrate 12a may be provided with a rear electrode 13a and a rear alignment layer 14a.

On the rear substrate 12a, a number of gate lines (not shown), data lines (not shown), switching elements (not shown), and the rear electrode 13a may be installed.

The gate lines are arrayed in lines and configured to deliver gate signals, and the data lines are arrayed in columns and configured to deliver data signals. The rear electrodes 13a may be connected to the gate lines and data lines.

As illustrated in FIG. 1, the switching elements may be implemented with Thin Film Transistors (TFTs) formed at intersections of the gate lines and data lines. A source electrode of a TFT is connected to a data line, the gate electrode of the TFT is connected to a gate line, and a drain electrode of the TFT is connected to the rear electrode 13a and a capacitor.

According to one embodiment, the gate and data lines may be formed of particular materials, such as Indium Tin Oxide (ITO) or Indium Zinc Oxide (IZO).

When a scan signal is applied to the gate line, the TFT is turned on and delivers a data signal supplied from the data line to the rear electrode 13a.

The rear alignment layer 14a may be formed on the front surface of the rear electrode 13a, and the liquid crystal layer 15 may be provided between the rear alignment layer 14a and the front alignment layer 14b.

Meanwhile, FIG. 4 shows that a size of the rear electrode 13a is different from a size of the rear alignment layer 14a, but it is for convenience of description. Therefore, the rear electrode 13a may have various sizes.

In front of the liquid crystal layer 15, the front alignment layer 14b, a front electrode 120, and a film polarizer 110 may be provided in order.

The front alignment layer 14b is formed of the same material as the rear alignment layer 14a, and the front electrode 120 is coated with the front alignment layer 14b. Details of the method of manufacturing the front alignment layer 14b and the front electrode 120 will be described later under FIG. 5.

The front electrode 120 serves as a common electrode. However, on the disclosed display panel 100, a transparent film of the front electrode may be coated with silver nanowires or graphene 121.

When a predetermined voltage is applied to the front electrode 120, an electric field is formed between the front electrode 120 and the rear electrode 14a, and the arrangement of the liquid crystal molecules forming the liquid crystal layer 15 is adjusted by the formed electric field.

On the front surface of the front electrode 120 that is coated with silver nanowires or graphene, the film polarizer 110 using a transparent film may be provided.

That is, in the display panel 100 according to one embodiment, the front polarizer 11b using WGP may be replaced with the film polarizer 110 the same as the rear polarizer 11a, and the display panel 100 may include the front electrode 120 coated with silver nanowires or graphene.

The film polarizer 110 may be a polarizer film formed of the same material as the rear polarizer 11a, and there is no limitation in a material of the film polarizer 110 as long as it is not WGP.

Depending on an arrangement of the array of liquid crystals, a direction in which the light incident to the liquid crystal layer 15 vibrates may vary or remain unchanged. For example, in a case that the rear polarizer 11a is a vertical polarizer, the film polarizer 110 is a horizontal polarizer, and the liquid crystals are spirally arrayed, the light that has been vertically polarized while passing through the rear polarizer 11a is polarized horizontally while passing through the liquid crystal layer 15. The light polarized horizontally may pass through the film polarizer 110 and be incident to the quantum dot color filter layer 16 which is located on the front surface of the film polarizer 110.

The quantum dot color filter layer 16 may include a red light converter 16R configured to convert an incident light ray into red light, a green light converter 16G configured to convert an incident light ray into green light, and a light transmitter 16T configured to transmit an incident light ray without color conversion. The order in which the converters and transmitter are arranged may be different from the order as shown in FIG. 4.

The red light converter 16R and the green light converter 16G may use quantum dots in order to convert respective colors of light. The light transmitter 16T may have the form of a cavity for the incident light to pass as it is, or may be formed of a transparent resin, such as acryl-nitrile butadiene styrene (ABS), poly methyl methacrylate (PMMA), or poly carbonate (PC).

A quantum dot refers to a small spherical semiconductor particle that has a diameter of a few nanometers, and may include a few to tens of nanometers of core and a coating formed of zinc sulfide (ZnS). For example, any of cadmium selenide (CdSe), cadmium telluride, or cadmium sulfide (CdS) may be used for the core of the quantum dot.

Because the quantum dot is very small in size, a quantum confinement effect occurs. The quantum confinement effect refers to an effect in which an electron in a very small particle contributes to a discontinuous energy state due to an outer wall of the particle, which may give rise to a phenomenon by which as the size of space in the particle decreases, the energy level of the electron becomes relatively high and the energy band gap becomes larger. Due to this quantum confinement effect, the quantum dot may produce light of a wide range of wavelengths when the light, such as ultraviolet rays or visible rays, is incident upon the quantum dot.

A wavelength of the light produced from the quantum dot may vary based on the size of the particle. In particular, if the light of a wavelength for which an energy level is greater than the energy band gap is incident upon the quantum dot, the quantum dot is excited by absorbing the energy of the light, and the quantum dot is in the ground state by emitting light of a particular wavelength. In this case, as the size of the quantum dot decreases, the quantum dot produces light that has a relatively short wavelength, e.g., blue light or green light, and as the size of the quantum dot increases, the quantum dot produces light that has a relatively long wavelength, e.g., red light. Accordingly, various colors of light may be implemented in accordance with the size of the quantum dot.

To partition the respective cells of the red light converter 16R, green light converter 16G, and light transmitter 16T, a partition wall (not shown) may be provided. The partition wall may be in the form of black matrices. The partition wall may be configured to block the light from moving into another cell, thereby improving contrast.

The partition wall may be implemented in black color so as to absorb light, and may be formed of metals, synthetic resins, synthetic rubbers, or organic carbon materials. For example, the partition wall may be formed of chrome (Cr) films, chrome oxide (CrOx) films, or double films including the same.

The red light converter 16R, the green light converter 16G, and the light transmitter 16T may constitute a single pixel P. Such pixels formed by the red light converter 16R, the green light converter 16G, and the light transmitter 16T may be arrayed two-dimensionally in order to implement respective colors of a 2D image.

The front substrate 12b may be provided on the front surface of the quantum dot color filter layer 16, and may be formed of a synthetic resin such as acryl, or glass.

FIGS. 5 to 11 are views showing a method of manufacturing process of the display panel according to one embodiment of the present disclosure. To avoid redundant descriptions, the following will be described together.

As described above, the disclosed display panel 100 includes the film polarizer 110 instead of WGP. As mentioned above, when the transparent electrode having ITO, and the alignment layer 14b process is performed after laminating the film polarizer 110, the deformation of the polarizer may easily occur or the deterioration may occur in properties due to the high temperature. Therefore, in the disclosed display panel 100, the alignment layer 14b is manufactured separately from the front electrode 120 and then laminated to the film polarizer 110 and thus the deformation caused by the high-temperature process may be prevented.

Figure 5:
FIGS. 5 to 11 are views showing a method of manufacturing process of the display panel according to one embodiment of the present disclosure.

Referring to FIG. 5, the front electrode 120 is firstly manufactured. The front electrode 120 may be manufactured such that the transparent electrode 121 is coated with silver nanowires or graphene 121 at a low temperature.

The front electrode 120 manufactured in this way serves as the common electrode of the display panel 100.

Figure 6:

Referring to FIG. 6, the front electrode 120 is coated with an alignment layer. The alignment layer coated thereon corresponds to the front alignment layer 14b of FIG. 4.

The coating of the alignment layer may include a rubbing process for rubbing a surface with cotton or rayon cloth, after coating polyimide corresponding to the polymer alignment layer with 1000 angstrom or less. Through the rubbing process, the liquid crystal aligns in a rubbing direction.

Figure 7:
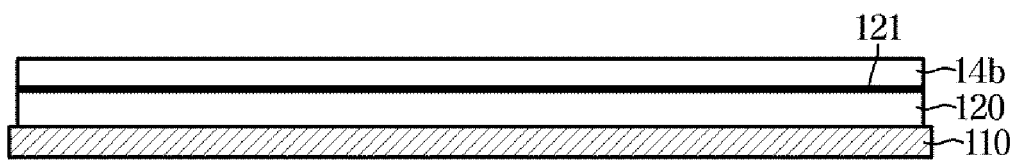

Referring to FIG. 7, the front electrode 120 coated with the front alignment layer 14b is laminated with the front polarizer 110. The laminating process represents a process in which two layers are attached to each other by using an adhesive. That is, the front electrode 120 coated with the front alignment layer 14b is attached to the front polarizer 110.

Figure 8:
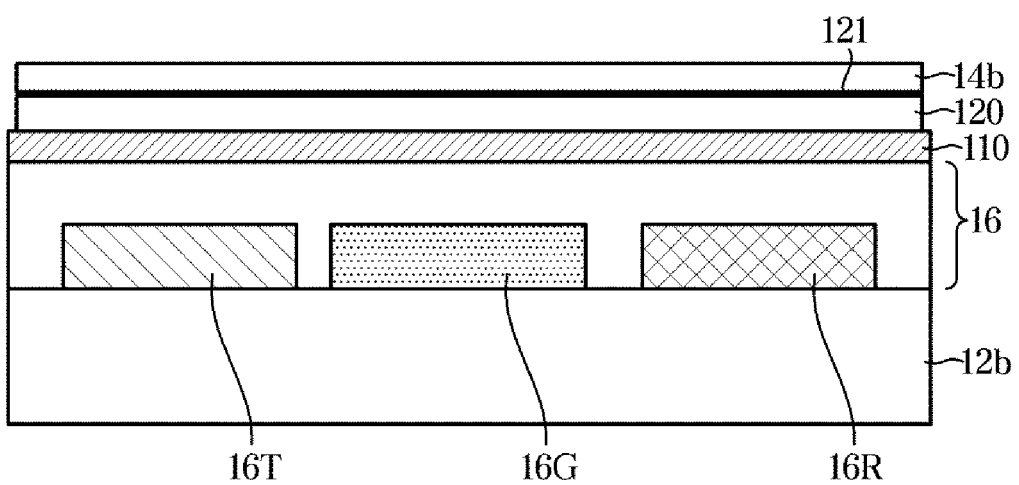

Referring to FIG. 8, the film polarizer 110 laminated with the front electrode 120 coated with the alignment layer 14b is laminated with the quantum dot color filter layer 16 and the front substrate 12b. Particularly, the front polarizer 110 is laminated with a planarization layer (not shown) of the quantum dot color filter layer 16.

The quantum dot color filter layer 16 and the front substrate 12b are manufactured by pre-laminated with each other.

On the other hand, the planarization layer (not shown) may be formed on the quantum dot color filter layer 16. The planarization layer (not shown) may also be referred to as an overcoat. For example, the planarization layer (not shown) may include an acrylic resin or polyimide resin. However, the material is only examples that can be used in a planarization layer (not shown), and thus embodiments of the display panel 100 is not limited thereto.

When the planarization layer (not shown) is formed on the quantum dot color filter layer 16, it may be possible to implement an excellent image quality although a surface thereof is not planar due to a step between members constituting the quantum dot color filter layer.

Figure 9:
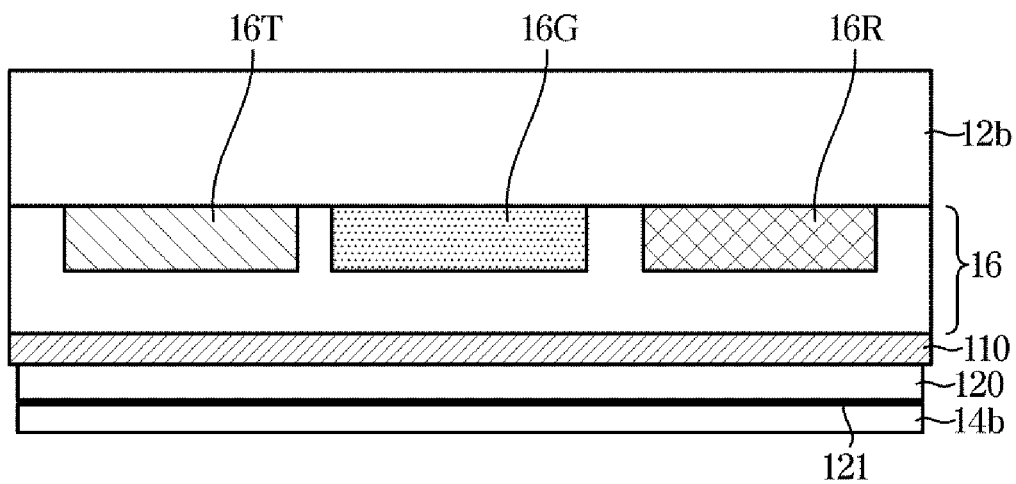

Referring to FIG. 9, the laminated upper plate is flipped. That is, the flipped upper plate has the same shape as the upper substrate of FIG. 4.

Particularly, through the above mentioned manufacturing process, the upper substrate may include the front substrate 12b, the quantum dot color filter layer 16, the front polarizer 110, the front electrode 120, and the front alignment layer 14b in order.

Figure 10:
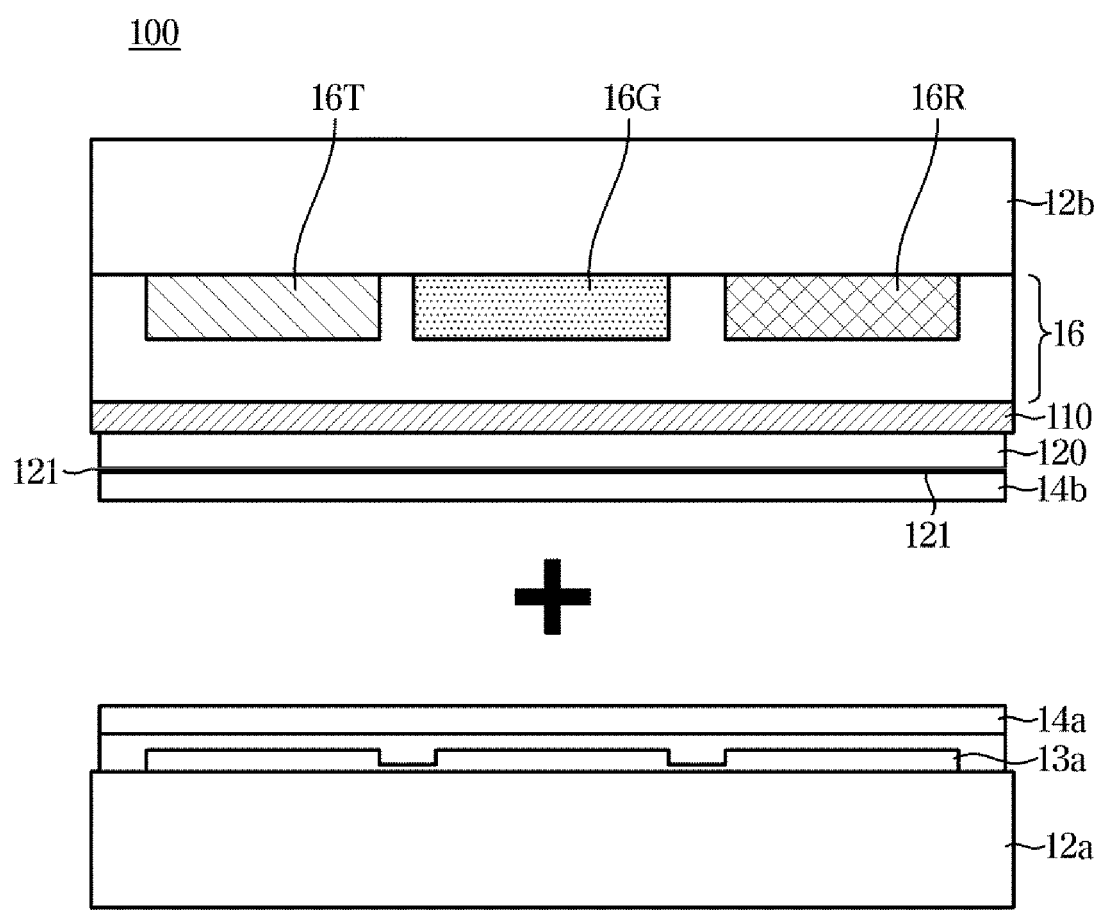

Referring to FIG. 10, a liquid crystal is injected between the flipped upper and lower substrates. The liquid crystal injected between the front alignment layer 14b and the rear alignment layer 14a forms the liquid crystal layer 15.

As illustrated in FIG. 4, the lower substrate may sequentially include the rear alignment layer 14a, the rear electrode 13a, and the rear substrate 12a with respect to the liquid crystal layer 15.

Figure 11:
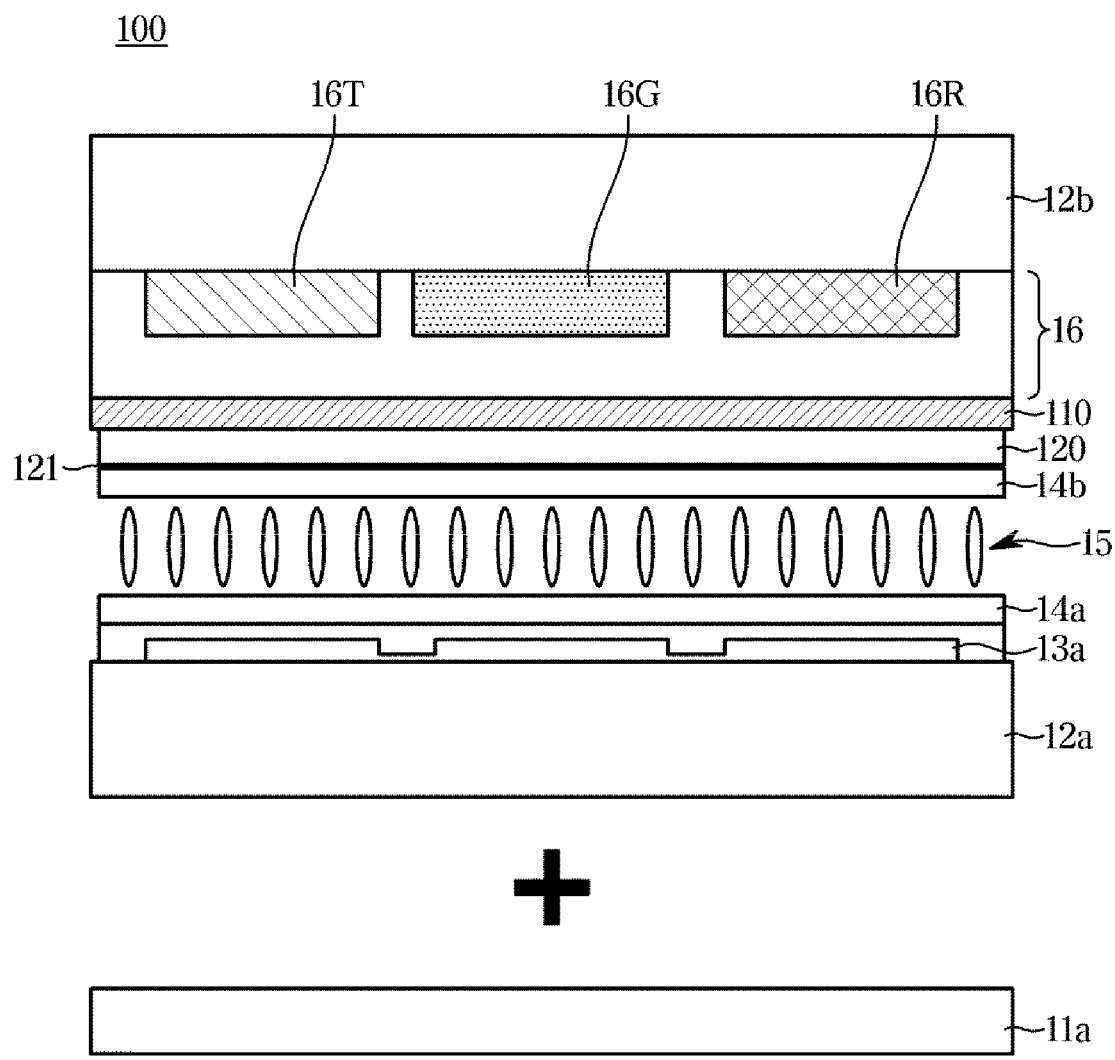

Referring to FIG. 11, after injecting the liquid crystal between the upper substrate and the lower substrate, the rear polarizer 11a is attached. The rear polarizer 11a is manufactured with a polarizer film that is the same as the front polarizer of the upper substrate.

Figure 12:
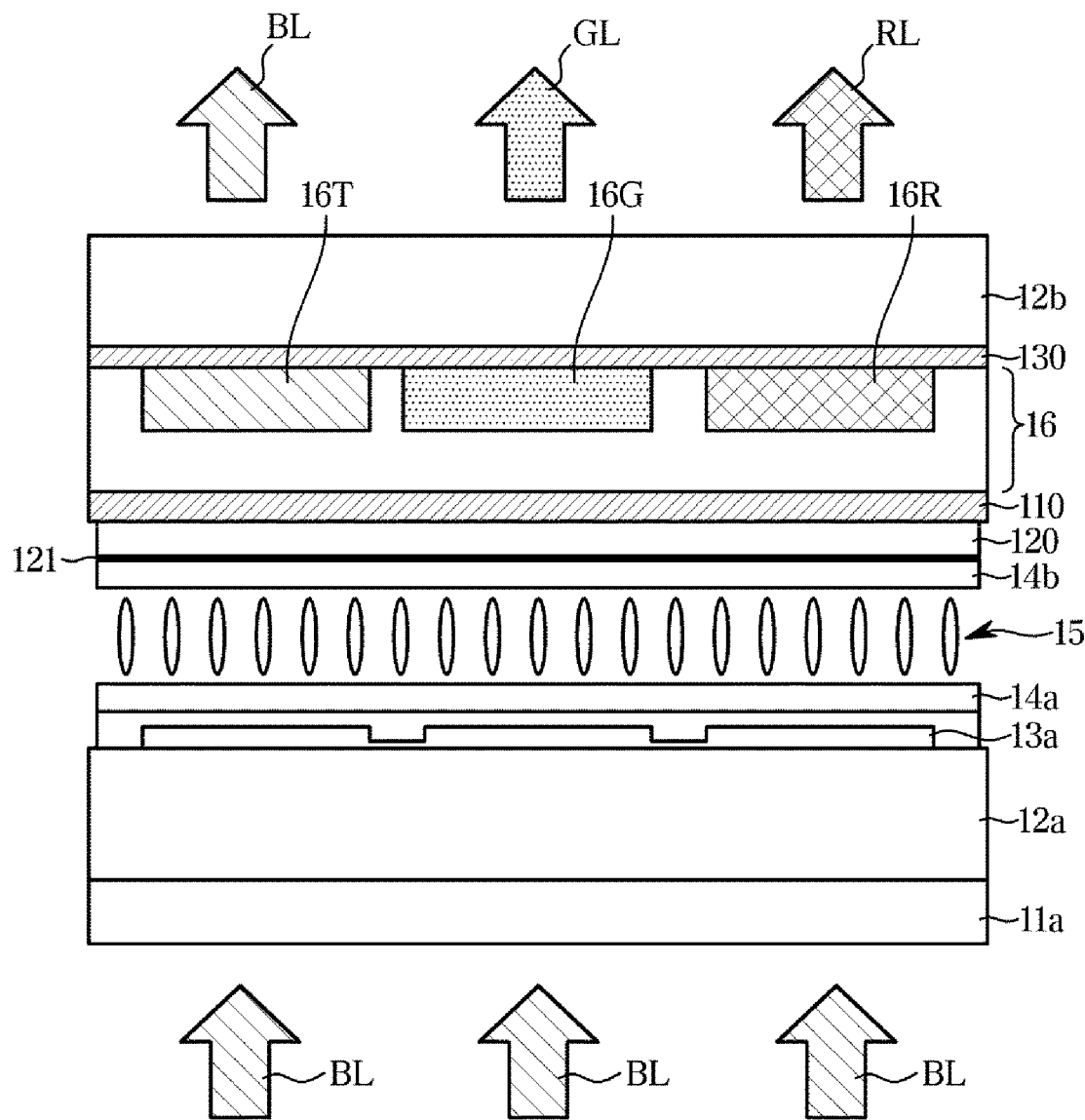
FIG. 12 is a cross-sectional view of a display panel according to another embodiment of the present disclosure.

FIG. 12 is a cross-sectional view of a display panel according to another embodiment of the present disclosure.

Referring to FIG. 12, a display panel 101 according to another embodiment may be configured such that a low refractive layer 130 is further provided to the display panel 100 of FIG. 4. A description of the same configuration as the display panel 100 of FIG. 4 will be omitted.

The low refractive layer 130 formed of a low refractive medium may be arranged on the front surface of the quantum dot color filter layer 16.

The low refractive layer 130 may have a lower refractive index than the quantum dot color filter layer 16. Furthermore, the low refractive layer 130 may have a lower refractive index than the front substrate 12b that is located on the front surface of the low refractive layer 130. For example, the low refractive layer 130 may have a refractive index within a range of from about 1.2 to about 1.4.

The low refractive layer 130 may be formed of a resin and nano-particles, such as zinc oxide (Zn), or titanium dioxide (TiO2), which are distributed in the resin. The materials like zinc oxide and titanium dioxide are only examples to be applied in the low refractive layer 130, but the embodiments of the display panel 100 is not limited thereto.

The low refractive layer 130 may reduce a proportional amount of light that is subjected to total internal reflection at the boundary surface between the front substrate 12b and the external air by reducing an angle at which the light is output from the low refractive layer 130 to the front substrate 12b, or by totally reflecting the rays having large incidence angles from among rays output from the quantum dot color filter layer 16. Influences of the low refractive layer 130 to a light path will be described with reference to FIGS. 13 and 15.

Figure 13:
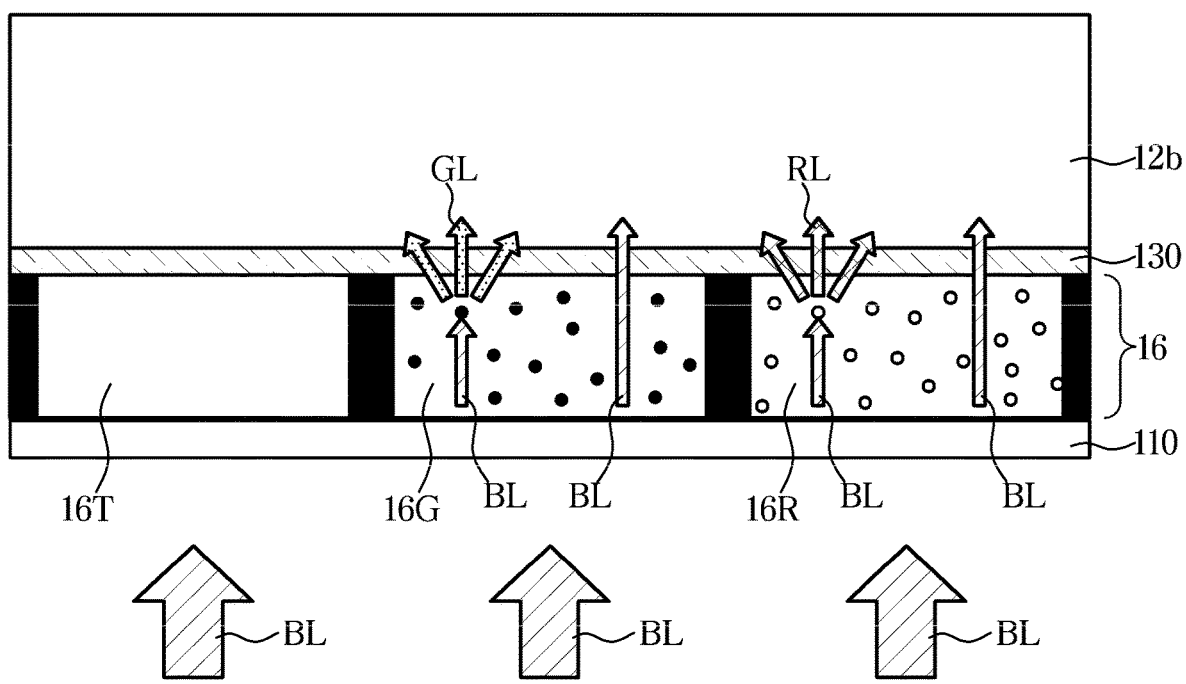
FIG. 13 is a cross-sectional view showing an internal configuration of a quantum dot color filter layer of the display panel according to one embodiment.

FIG. 13 is a cross-sectional view showing an internal configuration of a quantum dot color filter layer of the display panel according to one embodiment.

As illustrated in FIG. 4, a quantum dot refers to a small spherical semiconductor particle that has a diameter of a few nanometers. Further, because the quantum dot is very small in size, a quantum confinement effect occurs. Due to this quantum confinement effect, the quantum dot may produce light of a wide range of wavelengths when the light, such as ultraviolet rays or visible rays, is incident upon the quantum dot.

Hereinafter, a quantum dot particle that may emit green light is referred to as a green quantum dot particle, and a quantum dot particle that may emit red light is referred to as a red quantum dot particle.

For example, the green quantum dot particle may be a particle that has a width of between about 2 nanometers and about 3 nanometers, and the red quantum dot particle may be a particle that has a width of between about 5 and about 6 nanometers.

Referring to FIG. 13, the red light converter 16R may include red quantum dot particles and the green light converter 16G may include green quantum dot particles. For example, the red light converter 16R may be formed such that red quantum dot particles are distributed in a resin, and the green light converter 16G may be formed such that green quantum dot particles are distributed in a resin.

Figure 14:
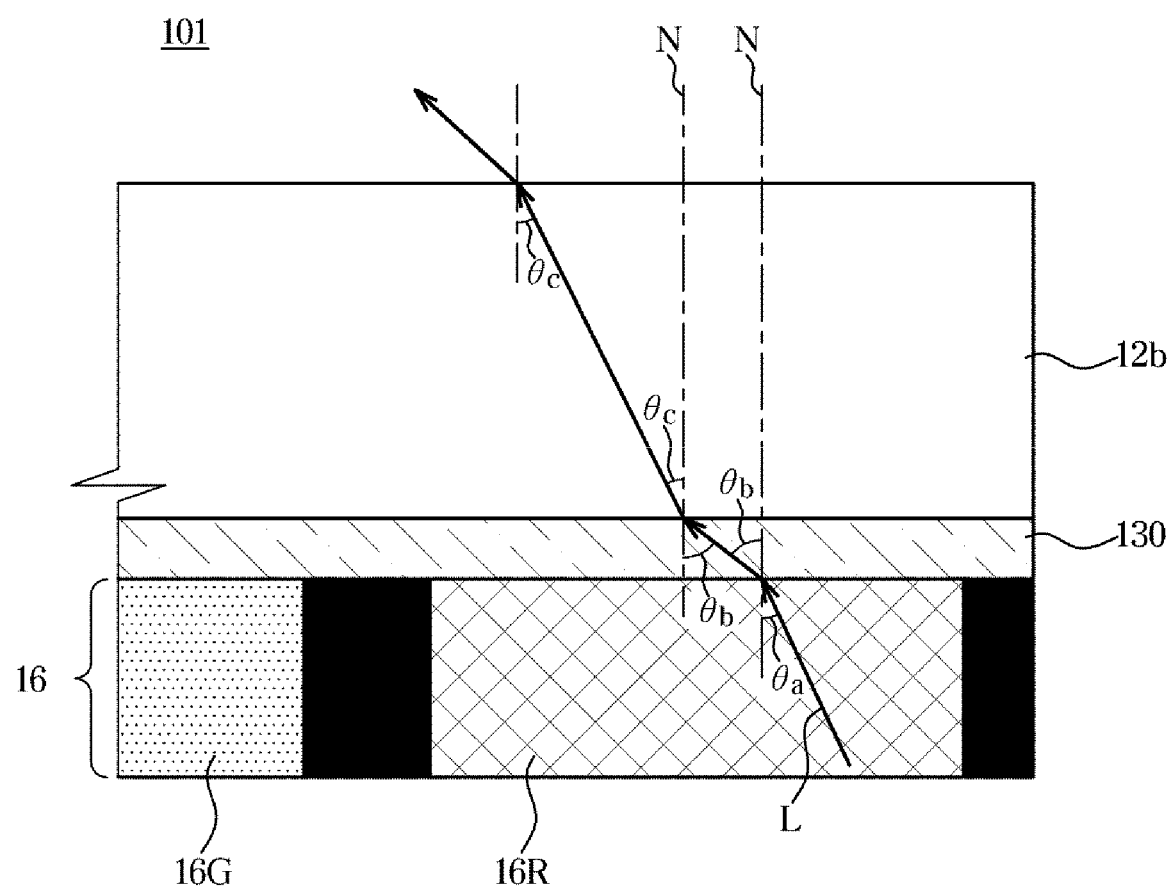
FIGS. 14 and 15 are views showing a propagation path of light within the display panel according to one embodiment.
Figure 15:
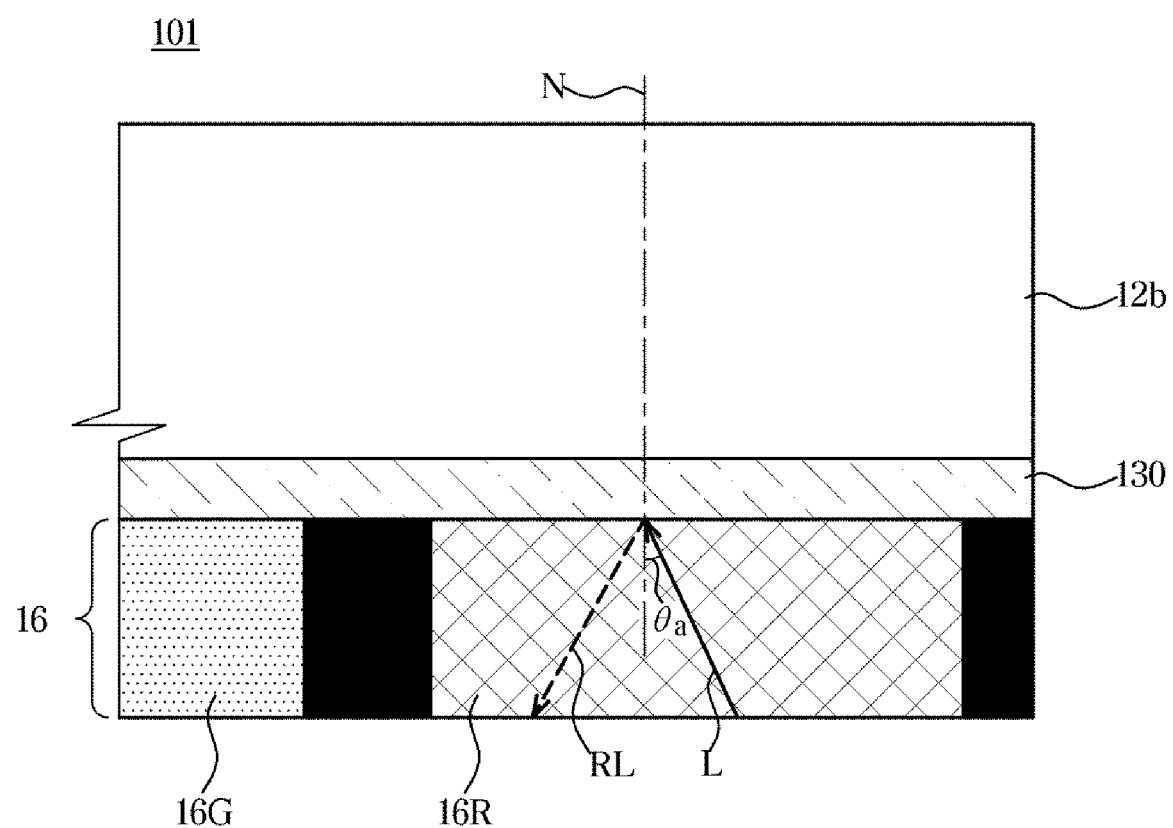

FIGS. 14 and 15 are views showing a propagation path of light within the display panel according to one embodiment. A structure disposed in rear of the quantum dot color filter layer 16 will be omitted in FIGS. 14 and 15.

As described above, light incident from a medium having a relatively high refractive index to a medium having a lower refractive index bends toward the medium having the higher refractive index at the boundary surface between the two mediums, and total internal reflection occurs when the incidence angle of the light is equal to or greater than the total reflection threshold angle. Since the refractive index of the low refractive layer 130 is lower than that of the quantum dot color filter layer 16, the light L incident from the quantum dot color filter layer 16 to the low refractive layer 130 is bent toward the quantum dot color filter layer 16, as illustrated in FIG. 14. In particular, an incidence angle θa is smaller than a refraction angle θb. The incidence angle and refraction angle are measured with respect to a normal line N which is perpendicular to a plane that is parallel with the display panel 100.

Furthermore, since the refractive index of the front substrate 12b is higher than that of the low refractive layer 130, the light L incident from the low refractive layer 130 to the front substrate 12b bends toward the front substrate 12b. That is, the incidence angle θb is greater than a refraction angle θc.

The refraction angle θc in the front substrate 12b is equal to an incidence angle at which the light is incident into the external air. Particularly, because the low refractive layer 130 is located between the quantum dot color filter layer 16 and the front substrate 12b, the incidence angle of light incident to the external air from the front substrate 12b is reduced. Accordingly, a proportional amount of light that is subjected to total internal reflection between the front substrate 12b and the external air is reduced.

Referring to FIG. 15, when the incidence angle θa at which the light Lis incident from the quantum dot color filter layer 16 to the low refractive layer 130 is equal to or greater than the total reflection threshold angle, total internal reflection occurs at the boundary surface between the quantum dot color filter layer 16 and the low refractive layer 130 toward the quantum dot color filter layer 16. That is, the light L that was directed to the low refractive layer 130 moves back to the inside of the quantum dot color filter layer 16.

That is, since the light with large incidence angle is already totally reflected at the boundary surface between the quantum dot color filter layer 16 and the low refractive layer 130, a proportional amount of total reflection at the boundary surface between the front substrate 12b and the external air may be reduced. Accordingly, a phenomenon that the light totally reflected at the boundary surface between the front substrate 12b and the external air moves to another pixel and thus causes degradation of image quality may be alleviated.

Figure 16:
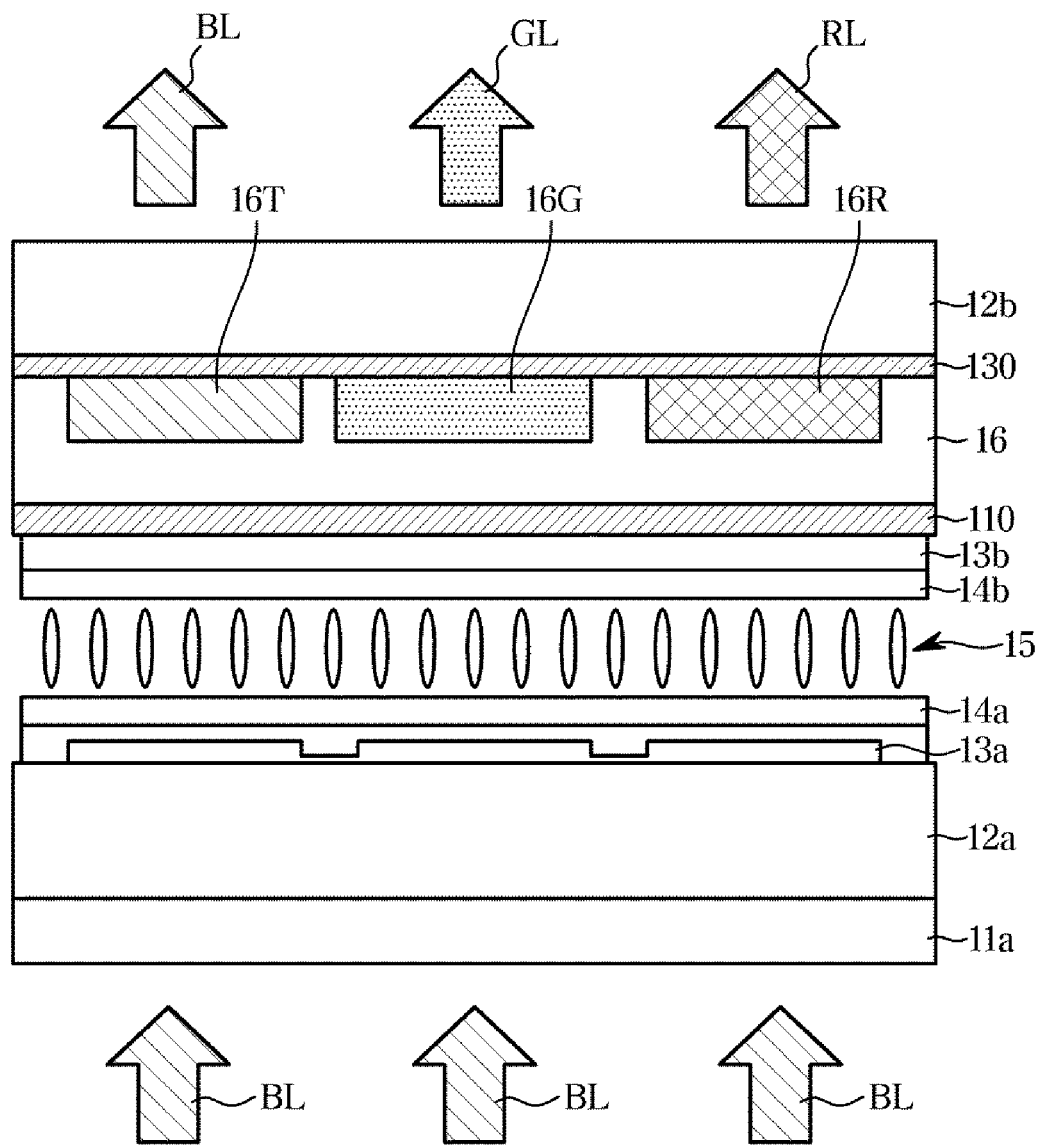
FIG. 16 is a cross-sectional view of a display panel according to still another embodiment of the present disclosure.

FIG. 16 is a cross-sectional view of a display panel according to still another embodiment of the present disclosure. The same description as the description of FIG. 4 will be omitted.

In comparison with FIG. 4, in a display panel 102 of FIG. 16, the front electrode 13b of FIG. 1 may be replaced with a transparent electrode 120 coated with silver nanowires.

That is, the front electrode 13b serving as the common electrode may be formed of a material such as indium tin oxide (ITO) or indium zinc oxide (IZO).

Figure 17:
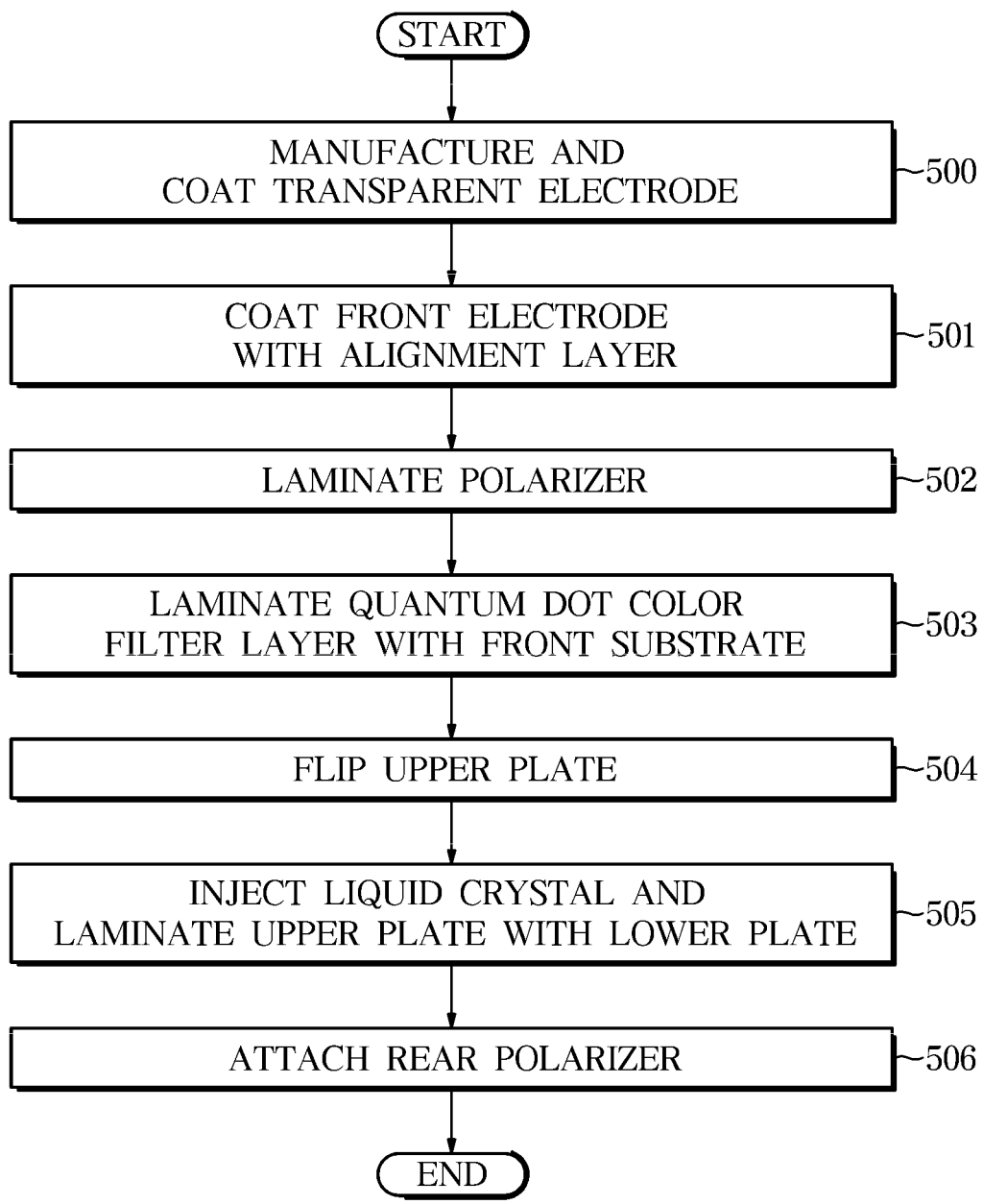
FIG. 17 is a flowchart showing a method of manufacturing process of the display panel according to one embodiment of the present disclosure.

FIG. 17 is a flowchart showing a method of manufacturing process of the display panel according to one embodiment of the present disclosure.

After the transparent electrode is manufactured, the transparent electrode may be coated with silver nanowires or graphene 121, as illustrated in FIG. 5 (500).

The coated transparent electrode corresponds to the front electrode 120, and manufactured on the upper substrate and serves as the common electrode.

The alignment layer is coated on the coated transparent electrode (501). The coated alignment layer corresponds to the front alignment layer 14b that is contained in the upper substrate.

The electrode plate coated with the alignment layer is laminated with a polarizer (502).

As illustrated in FIG. 7, the front electrode 120 coated with the front alignment layer 14b is laminated with a film polarizer 110 using a polarizer film.

The film polarizer 110 and the front electrode 120, which are laminated with each other, are laminated with the quantum dot color filter layer 16 and the front substrate 12b, which are separately manufactured (503).

The laminated substrate is flipped, and becomes the upper substrate (504), as illustrated in FIG. 9.

The liquid crystal is injected between the upper substrate and the lower substrate shown in FIG. 10 (505).

The display panel 100 is manufactured such that, after the liquid crystal layer 15 is formed, the rear polarizer 11a, which is formed of a polarizer film, is laminated to the lower surface of the lower substrate.

Hereinafter a display apparatus 1 having at least one of the display panel 100, 101 and 102 according to the above-described embodiments will be described.

Figure 18:
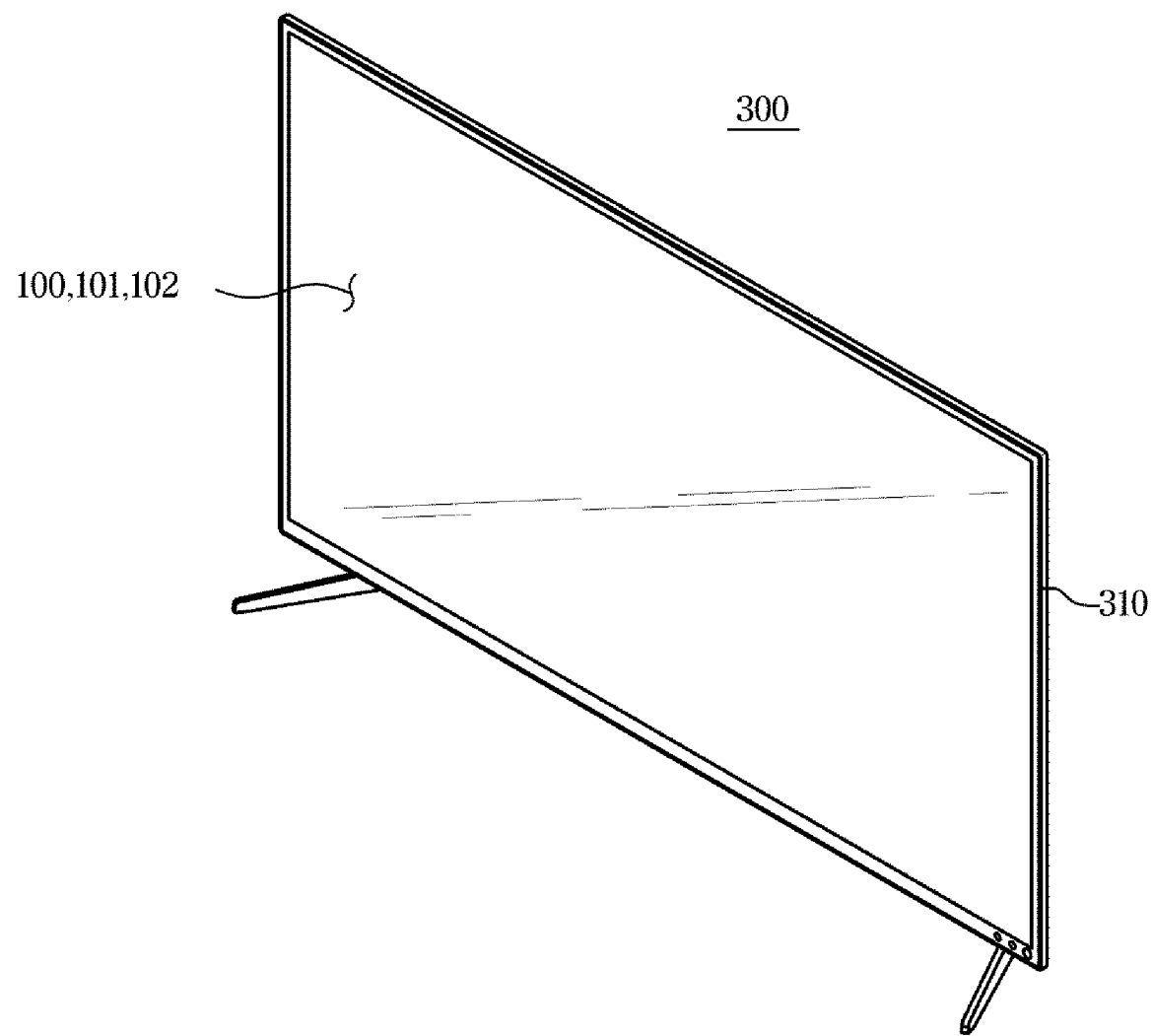
FIG. 18 is an external view of the display apparatus according to one embodiment.
Figure 19:
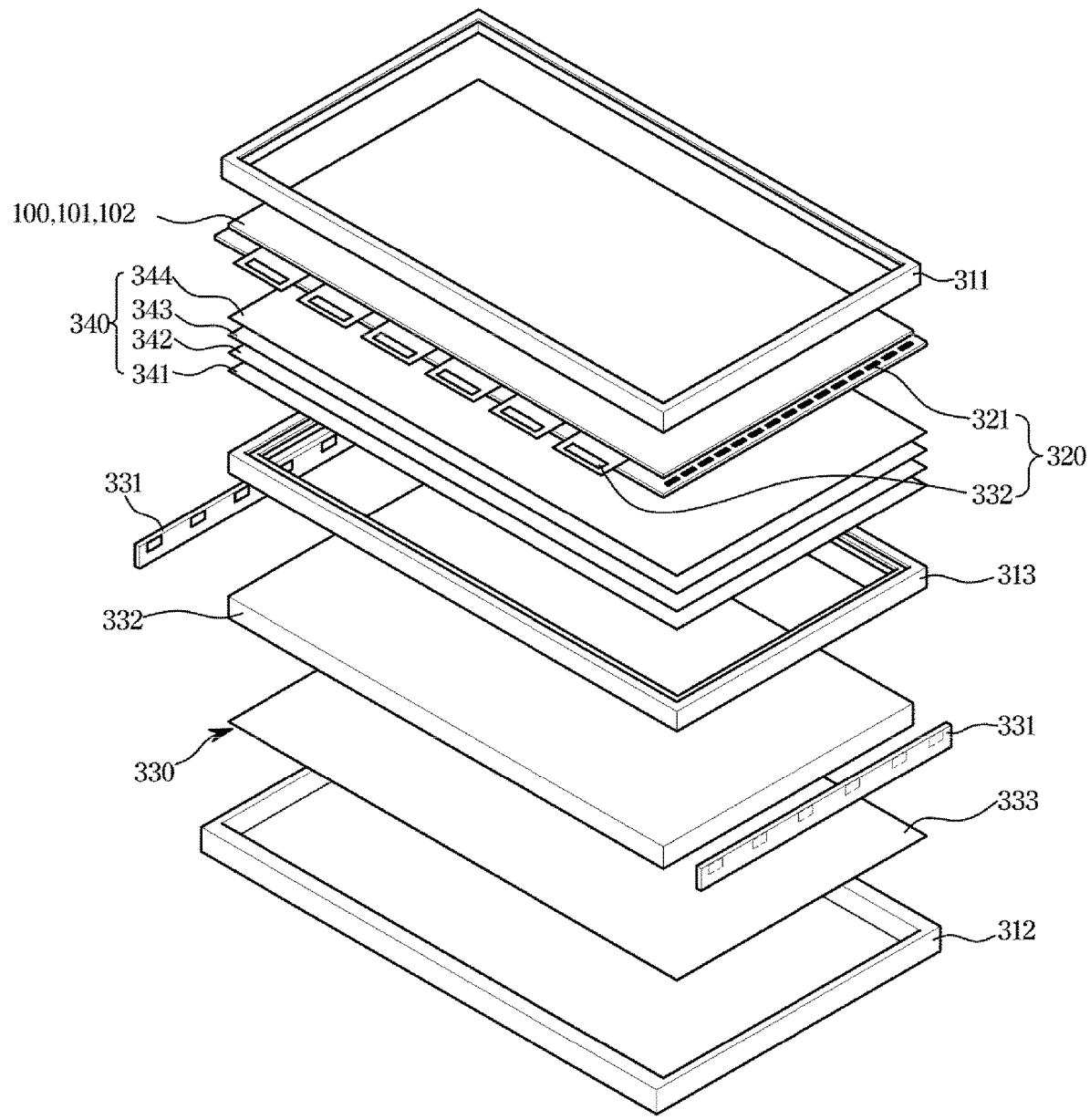
FIG. 19 is an exploded-perspective view of the display apparatus according to one embodiment.

FIG. 18 is an external view of a display apparatus according to one embodiment, and FIG. 19 is an exploded-perspective view of the display apparatus according to one embodiment.

The display apparatus 300 is an apparatus configured to process image signals received from the outside and configured to visually display the processed image. In the following description, it is assumed that the display apparatus 300 is a television (TV), but embodiments are not limited thereto. For example, the display apparatus 300 may be implemented in various forms, such as any of a monitor, a portable multimedia device, a portable communication device, and any device that may visually present images.

Referring to FIGS. 18 and 19, the display apparatus 300 includes a body 310 accommodating various compartments, and a display panel 100, 101 and 102 configured to display images. The display apparatus 300 may include one of the display panel 100 according to one embodiment and the display panels 101 and 102 according to another embodiment.

Inside the body 310, a driving circuit 320, a back light unit (BLU) 330, and an optical member 340 are provided.

The body 310 may include a front chassis 311 located on the front side of the display apparatus 300, a rear chassis 312 located on the rear side of the display apparatus 300, and a mold frame 313 located inside the display apparatus 300.

The front chassis 311 may be coplanar with the display panel 100, 101 and 102, which display images, to prevent edges of the display panel 300 from not being exposed.

The rear chassis 312 may be arranged on the opposite side of the display panel 100, 101 and 102, so as not to expose various components included in the display apparatus 300, and so as to protect the various components of the display apparatus 300 against external shocks.

The mold frame 313 restricts movement of the display panel 100, 101 and 102, the optical member 340, and the BLU 330, and fastens the display panel 100, 101 and 102, the optical member 340, and the BLU 330 to the front chassis 311 and rear chassis 312.

The driving circuit 320 is configured to provide driving signals in order to drive the display panel 100, 101 and 102. The driving circuit 320 may include a gate driving circuit 321 and a data driving circuit 322.

The gate driving circuit 321 may be connected to gate lines (not shown) of the display panel 100, 101 and 102 and configured to transmit gate signals to the gate lines. The data driving circuit 322 may be connected to data lines (not shown) of the display panel 100, 200 and configured to transmit data signals to the data lines.

The BLU 330 is installed behind the display panel 100, 101 and 102 and configured to generate light to allow the display panel 100, 101 and 102 to generate an image. The BLU 330 may be classified into an edge-type BLU within which respective light sources are located on corresponding sides of the display panel 100, 101 and 102, and a direct-type BLU within which a light source is located behind the display panel 100, 101 and 102.

In the following description, it is assumed that the BLU 330 corresponds to the edge-type BLU within which respective light sources are located on corresponding sides of the display panel.

The BLU 330 includes a light source 331 configured to generate light, a light guide plate (LGP) 332 configured to convert the light generated by the light source 331 to sheet light, and a reflector sheet 333 formed on the rear surface of the LGP 332 and configured to reflect light which is output from the LGP 332.

Each of the light sources 331 is arranged on a lateral side of the LGP 332 and configured to irradiate light toward the LGP 332. For example, the light source 331 may be configured to output blue light.

The light source 331 may employ low calorific light emitting diode (LED) or a Cold Cathode Fluorescent Lamp (CCFL).

The LGP 332 is configured to output light in the forward direction by changing a direction in which the incident light propagates. To change the light propagation direction, a plurality of swollen stripes may be formed on the front face of the LGP 332, and a plurality of dots may be formed on the rear face of the LGP 332. The respective sizes and intervals of the swollen stripes and dots may be adjusted in order to produce uniform light in the forward direction of the LGP 332.

Furthermore, the swollen stripes on the front surface of the LGP 332 may be embossed via execution of a printing method, and the dots on the rear surface of the LGP 332 may be formed in intaglio with laser beams.

Some of the rays incident into the LGP 332 are scattered by the dots formed on the rear surface of the LGP 332 and emitted in the forward direction of the LGP 332, and some other rays are reflected by the reflector sheet 333 formed on the rear surface of the LGP 332 toward the inside of the LGP 332. Further, some of the reflected rays may propagate toward the center of the LGP 332, and be emitted in the forward direction of the LGP 332 as a result of being scattered at the center of the LGP 332.

In this manner, the LGP 332 may emit relatively uniform rays in the forward direction via refraction, reflection, and scattering of the rays produced from inside the LGP 332.

The LGP 332 may employ a transparent and strong PMMA or PC material.

The reflective sheet 333 is formed on the rear side of the LGP 332 as described above, and is configured to allow some of the rays directed toward the rear face of the LGP 332 from inside of the LGP 332 to be reflected toward the inside of the LGP 332.

The reflective sheet 333 is manufactured by coating a base material with a material that has a relatively high reflective index. For example, the reflective sheet 333 may be manufactured by coating polyethylene terephthalate (PET) with a highly reflective polymer.

As described above, the BLU 330 may include the light source 331, the LGP 332, and the reflective sheet 333, and may be configured to uniformly emit sheet light.

The optical member 340 is configured to refract or scatter light in order to widen the viewing angle of the display apparatus 300 and increase a brightness of the display apparatus 300.

The optical member 340 may include various sheets. For example, the optical member 340 may include any of a diffuser sheet 341, a prism sheet 342, a protective sheet 343, and a brightness enhancement film 344.

The diffuser sheet 341 is configured to diffuse rays which are output from the BLU 330 along a plane, thereby enabling overall colors and brightness of the screen of the display apparatus 300 to be uniformly viewed. Since the rays output from the LGP 332 are output in accordance with patterns formed on the front face of the LGP 332, the patterns may be viewed from the rays output from the LGP 332.

In order to prevent the patterns formed on the front face of the LGP 332 from being viewed, the diffuser sheet 341 is further configured to diffuse the light output from the LGP 332 in a direction that is perpendicular to the direction in which the light is output.

In other words, the diffuser sheet 341 diffuses the light output from the BLU 330 so as to maintain a relatively uniform brightness of the entire plane.

Light is diffused in the direction that is perpendicular to the plane of the diffuser sheet 341 while propagating through the diffuser sheet 341, thereby drastically lowering the brightness. The prism sheet 342 refracts or focuses the light diffused by the diffuser sheet 341, thereby increasing the brightness.

Further, the prism sheet 342 includes prism patterns of a triangular prism form, and the prism patterns are arranged adjacent to one another to form a plurality of strips. In particular, the prism patterns are formed so as to protrude toward the display panel 100, 101 and 102 in a pattern of alternating ridges and valleys.

The protective sheet 343 protects many different components included in the BLU 330 against external shocks or inflow of foreign materials. The protective sheet 343 may also protect the prism sheet 342, which is susceptible to scratches.

The brightness enhancement film 344 is a type of polarizer film, and may also be referred to as a reflective polarizer film. The brightness enhancement film 344 is transparent to some of rays which are output from the BLU 330, which are polarized in parallel with the polarization direction of the brightness enhancement film 344, and is configured to reflect some other rays which are polarized in different directions than the polarization direction of the brightness enhancement film 344.

The rays are known as transverse waves that vibrate in a direction which is perpendicular to the light propagation direction. The polarizer film is transparent to some vibrating rays, which vibrate in a particular direction, and is configured to absorb other rays that vibrate in directions other than the particular direction.

On the contrary, the brightness enhancement film 344 is configured to reflect rays that are polarized in other directions than the polarization direction of the brightness enhancement film 344. The reflected rays are recycled inside the BLU 330, and the light recycling contributes to an improvement of the brightness of the display apparatus 300.

While the present disclosure has been particularly described with reference to exemplary embodiments, it should be understood by those of skilled in the art that various changes in form and details may be made without departing from the spirit and scope of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

The terms including any modifiers like "rear" and "front" may be used to explain various components, but the components are not limited by the terms. The terms are only for the purpose of distinguishing a component from another. For example, a rear element, component, region, layer or section could be termed a front element, component, region, layer or section without departing from the teachings of the present disclosure.

Furthermore, the terms as used throughout the specification, such as "~part", "~block", "~member", "~module", etc., may refer to a unit that is configured for performing at least one function or operation.

The invention claimed is:

1. A display panel comprising:
    a quantum dot color filter layer configured to convert a color of light emitted from a light source;
    a common electrode spaced apart from the quantum dot color filter layer;
    a film polarizer arranged between the quantum dot color filter layer and the common electrode, and configured to be laminated with the quantum dot color filter layer after being laminated with the common electrode,
    a transparent front substrate laminated with the quantum dot color filter layer; and
    a low refractive layer laminated directly to the quantum dot color filter layer, the low refractive layer being arranged between the quantum dot color filter layer and the transparent front substrate and having a refractive index that is lower than a refractive index of the quantum dot color filter layer.

2. The display panel according to claim 1, wherein the common electrode is coated with at least one of silver nanowires and graphene.

3. The display panel according to claim 1, wherein the common electrode is formed of a transparent electrode material, selected from at least one of Indium Tin Oxide (ITO) and Indium Zinc Oxide (IZO).

4. The display panel according to claim 1, further comprising:
    an alignment layer coated on the common electrode.

5. The display panel according to claim 1, wherein the refractive index of the low refractive layer is within a range of about 1.2 to about 1.4.

6. The display panel according to claim 5, wherein the low refractive layer comprises a resin; and nano-particles distributed in the resin, and the nano-particles are selected from at least one of titanium dioxide ($TiO_2$) and zinc oxide ($ZnO$).

7. A method of manufacturing a display panel, the method comprising:
    manufacturing a common electrode by coating the common electrode with a transparent electrode film;
    coating an upper surface of the common electrode with an alignment layer;
    laminating a film polarizer to a lower surface of the common electrode;
    laminating a quantum dot color filter layer converting a color of light emitted from a light source, to a lower surface of the film polarizer,
    laminating a transparent front substrate to a lower surface of the quantum dot color filter layer, and
    laminating a low refractive layer directly to the quantum dot color filter layer, the low refractive layer being arranged between the quantum dot color filter layer and the transparent front substrate and having a refractive index that is lower than a refractive index of the quantum dot color filter layer.

8. The method according to claim 7, wherein the manufacturing of the common electrode comprises manufacturing the common electrode by coating the common electrode with at least one of silver nanowires and graphene.

9. The method according to claim 7, wherein the transparent electrode film is formed of transparent electrode material selected from at least one of Indium Tin Oxide (ITO) and Indium Zinc Oxide (IZO).

10. The method according to claim 7, wherein the laminating of the quantum dot color filter layer comprises laminating the quantum dot color filter layer to the lower surface of the film polarizer after laminating the transparent front substrate to the lower surface of the quantum dot color filter layer.

11. The method according to claim 7, further comprising:
    manufacturing a lower substrate on which a rear alignment layer, a rear electrode and a rear substrate are sequentially arranged.

12. The method according to claim 11, further comprising:
    injecting a liquid crystal between the alignment layer and the rear alignment layer.

13. The method according to claim 12, further comprising:
    laminating a polarizing film layer to a lower surface of the rear substrate.

14. A display apparatus comprising:
    a back light unit having a light source;
    a quantum dot color filter layer arranged in front of the back light unit to convert a color of light emitted from the light source;
    a common electrode spaced apart from the quantum dot color filter layer;
    a film polarizer arranged between the quantum dot color filter layer and the common electrode, and configured to be laminated with the quantum dot color filter layer after being laminated with the common electrode,
    a transparent front substrate laminated with the quantum dot color filter layer; and
    a low refractive layer laminated directly to the quantum dot color filter layer, the low refractive layer being arranged between the quantum dot color filter layer and the transparent front substrate and having a refractive index that is lower than a refractive index of the quantum dot color filter layer.

* * * * *